(12) United States Patent
Deane et al.

(10) Patent No.: US 8,595,323 B2
(45) Date of Patent: Nov. 26, 2013

(54) PROVIDING EXCESS RESOURCES AS A SERVICE

(75) Inventors: Stephen Deane, London (GB); Julian Paul Thomas, Herts (GB)

(73) Assignee: Accenture Global Services Limited, Dublin (IE)

(*) Notice: Subject to any disclaimer, the term of this patent is extended or adjusted under 35 U.S.C. 154(b) by 1419 days.

(21) Appl. No.: 11/401,985

(22) Filed: Apr. 11, 2006

(65) Prior Publication Data

US 2007/0005387 A1    Jan. 4, 2007

Related U.S. Application Data

(60) Provisional application No. 60/671,375, filed on Apr. 14, 2005.

(51) Int. Cl.
*G06F 15/16* (2006.01)
*G06F 15/173* (2006.01)

(52) U.S. Cl.
USPC ............ 709/218; 709/203; 709/219; 709/225

(58) Field of Classification Search
USPC ......................... 709/203, 217–219, 225–226
See application file for complete search history.

(56) References Cited

U.S. PATENT DOCUMENTS

| | | | | |
|---|---|---|---|---|
| 6,744,727 B2* | 6/2004 | Liu et al. | | 370/228 |
| 6,807,426 B2* | 10/2004 | Pankaj | | 455/453 |
| 6,883,033 B2* | 4/2005 | Maruyama et al. | | 709/229 |
| 6,904,449 B1* | 6/2005 | Quinones | | 709/203 |
| 6,971,109 B1* | 11/2005 | Williams et al. | | 719/320 |
| 6,996,728 B2* | 2/2006 | Singh | | 713/300 |
| 7,324,976 B2* | 1/2008 | Gupta et al. | | 705/65 |
| 7,327,682 B2* | 2/2008 | Gandhi et al. | | 370/235.1 |
| 7,409,674 B2* | 8/2008 | Shenfield et al. | | 717/114 |
| 7,421,402 B2* | 9/2008 | Chang et al. | | 705/26 |
| 7,457,872 B2* | 11/2008 | Aton et al. | | 709/224 |
| 7,477,653 B2* | 1/2009 | Smith et al. | | 370/432 |
| 7,542,716 B2* | 6/2009 | Bell et al. | | 455/3.02 |
| 7,603,671 B2* | 10/2009 | Liu | | 718/1 |
| 7,698,182 B2* | 4/2010 | Falcone et al. | | 705/35 |
| 7,765,299 B2* | 7/2010 | Romero | | 709/226 |
| 7,925,757 B1* | 4/2011 | Rolia et al. | | 709/226 |

(Continued)

OTHER PUBLICATIONS

First Office Action from the Patent Office of the People's Republic of China, issued Apr. 30, 2010, in Chinese Patent Application No. 200680018870.5 (5 pages) and English-language translation (8 pages).

*Primary Examiner* — Minh-Chau Nguyen
(74) *Attorney, Agent, or Firm* — Finnegan, Henderson, Farabow, Garrett & Dunner LLP

(57) ABSTRACT

An integrated content production environment includes a connected services framework providing connectivity to a set of applications that produce content for the media industry. Users in their roles use the integrated environment to perform setting up, ingesting, logging, selecting, editing, reviewing, playout, distributing, and archiving activities. Notifications are dynamically triggered to users when their action is requested. The notifications may be instant messages, e-mails, voice mails, etc. Throughout the production of content, actions by both users the applications are tracked and stored in a log file for processing. The action data in the log file may include payload data from messages. When one or more applications or when one or more users of the environment have excess capacity, that capacity can be leveraged. External users can purchase or bid on the excess capacity and can then access the environment through available web services.

19 Claims, 16 Drawing Sheets

(56) References Cited

U.S. PATENT DOCUMENTS

| | | |
|---|---|---|
| 7,944,863 B2 * | 5/2011 | Smith et al. .................. 370/265 |
| 8,024,736 B1 * | 9/2011 | Graupner et al. ............. 718/104 |
| 2002/0065864 A1 * | 5/2002 | Hartsell et al. ............... 709/100 |
| 2003/0187908 A1 * | 10/2003 | Boucher ....................... 709/103 |
| 2004/0220821 A1 * | 11/2004 | Ericsson et al. .................. 705/1 |
| 2004/0261136 A1 * | 12/2004 | Aratani et al. ................ 725/151 |
| 2007/0005385 A1 * | 1/2007 | Deane et al. ...................... 705/1 |
| 2009/0055749 A1 * | 2/2009 | Chatterjee et al. ............ 715/738 |

* cited by examiner

PROVIDING EXCESS RESOURCES AS A SERVICE

This application claims the benefit of U.S. Provisional Application No. 60/671,375 filed Apr. 14, 2005, titled "CONNECTED SERVICES FRAMEWORK FOR THE MEDIA AND ENTERTAINMENT INDUSTRY", and U.S. patent application Ser. No. 11/364,411, filed on Feb. 27, 2006, titled "DYNAMICALLY TRIGGERING NOTIFICATIONS TO HUMAN PARTICIPANTS IN AN INTEGRATED CONTENT PRODUCTION PROCESS", which are both incorporated herein by reference.

BACKGROUND OF THE INVENTION

This invention relates to the production of content for the media industry, and more specifically it relates to a system that seamlessly connects all aspects of the digital broadcast production process.

A fundamental change is occurring in the media and entertainment industry; content is being digitized. Music is now often purchased as a digital file from an on-line music store and the listened to with an MP3 player. Already some television shows and movies may similarly be purchased and downloaded. The post production of movies and television programming is also often handled electronically in digital format.

There are now a number of software systems used in the content production process. Each tool is used for a certain purpose and many of the tools are excellent performers. Unfortunately, these tools create "digital islands" in which manual processes are still required to move content from one island to another. These manual processes introduce unnecessary delays in the production process, which slows down the time it takes to bring content to market. Because so much of the process is still handled manually, it is difficult and time consuming to track the status of the various content assets being worked on.

Because the content is moved from one tool to another tool manually, the current production methodology does not offer enough protection against piracy. The current production methodology also lacks a way to readily introduce new or improved software products. As a result, new software products are haphazardly added to the process without a smooth integration with the other tools.

The present method for content production is deficient in several ways. There is a need for a content production system in which the various software tools are flexibly connected and the amount of manual work is minimized. There is a need to minimize delays that are caused when waiting for a person to perform a manual task. There is also a need to leverage the excess capacity of the content production system to minimize downtime and maximize revenue. There is a need to track the processing of the system for use by external business applications, such as invoicing or management systems.

BRIEF SUMMARY OF THE INVENTION

An integrated content production environment includes a connected services framework providing connectivity to a set of applications that produce content for the media industry. Users in their roles use the integrated environment to perform setting up, ingesting, logging, selecting, editing, reviewing, playout, distributing, and archiving activities. It is one object of the invention to minimize delays by notifying users when their action is requested or needed. It is one object of the invention to maintain a log of action data from both the applications in the system as well as the users of the system. It is one object of the invention enabling external parties to have access to the applications or the activities performed by the system users when the system users or the applications have excess capacity. It is one object of the invention to enable such access to external parties through one or more web services.

One embodiment of the present invention provides dynamic notifications in an integrated content production process. The integrated content production system is a series of applications connected by an enterprise service bus. A notification message is automatically sent to a recipient when that recipient is needed to perform a particular production activity. The notification message may include a reference to the production activity.

One embodiment of the present invention provides tracking of both human actions and computer system actions in the integrated content production system. The actions tracked may be between a human and the system, between two applications in the system, between an application and content data, between an external system and an exposed web service, etc. Action data is produced for each action and may be stored in a log file. The action data may include payload data. The payload data may be the contents of a SOAP message, a graphic file representative of a content asset, encoded key frame image data, etc.

One embodiment of the present invention leverages excess capacity in the integrated content production environment. Capacity is identified and a web service for accessing functionality of the system is exposed to an external system. Capacity may be for a single application in the environment, for an integrated set of applications, or for the work accomplished by one or more environment personnel. A content asset may be received from the external system and one or more environment personnel may be instructed to act upon the content asset to generate a deliverable asset. Payment may be received by the external system for its call to the web service.

BRIEF DESCRIPTION OF THE DRAWINGS

FIG. 11 is a screen shot of the review screen.

FIG. 14 is a screen shot of the log file feature.

DETAILED DESCRIPTION OF THE INVENTION

In current broadcast environments, the tasks brought together by the present invention are stand-alone and require that personnel perform the process steps with little controlling structure to produce a piece of content. The present invention links together these disparate systems into a well-controlled process that reduces the reliance on human interaction. Microsoft's Connected Services Framework (the "CSF") software system is one of the components making up the present invention. The CSF enables the tools to be tightly integrated, while at the same time loosely coupled so that individual tools can be swapped in and out as desired. With CSF, the tools do not need to be from a single vendor; the tools can be from any of a number of vendors. The CSF enables the functions from the tools to be visible to the various front-end applications, and creates a 'digital spine' for a production company. This digital spine connects the tools and allows content assets to travel smoothly among them. The CSF is not limited to the content items for the production process and therefore the digital spine also enables sales, marketing, resource scheduling and other types of information to be handled.

Figure 1:
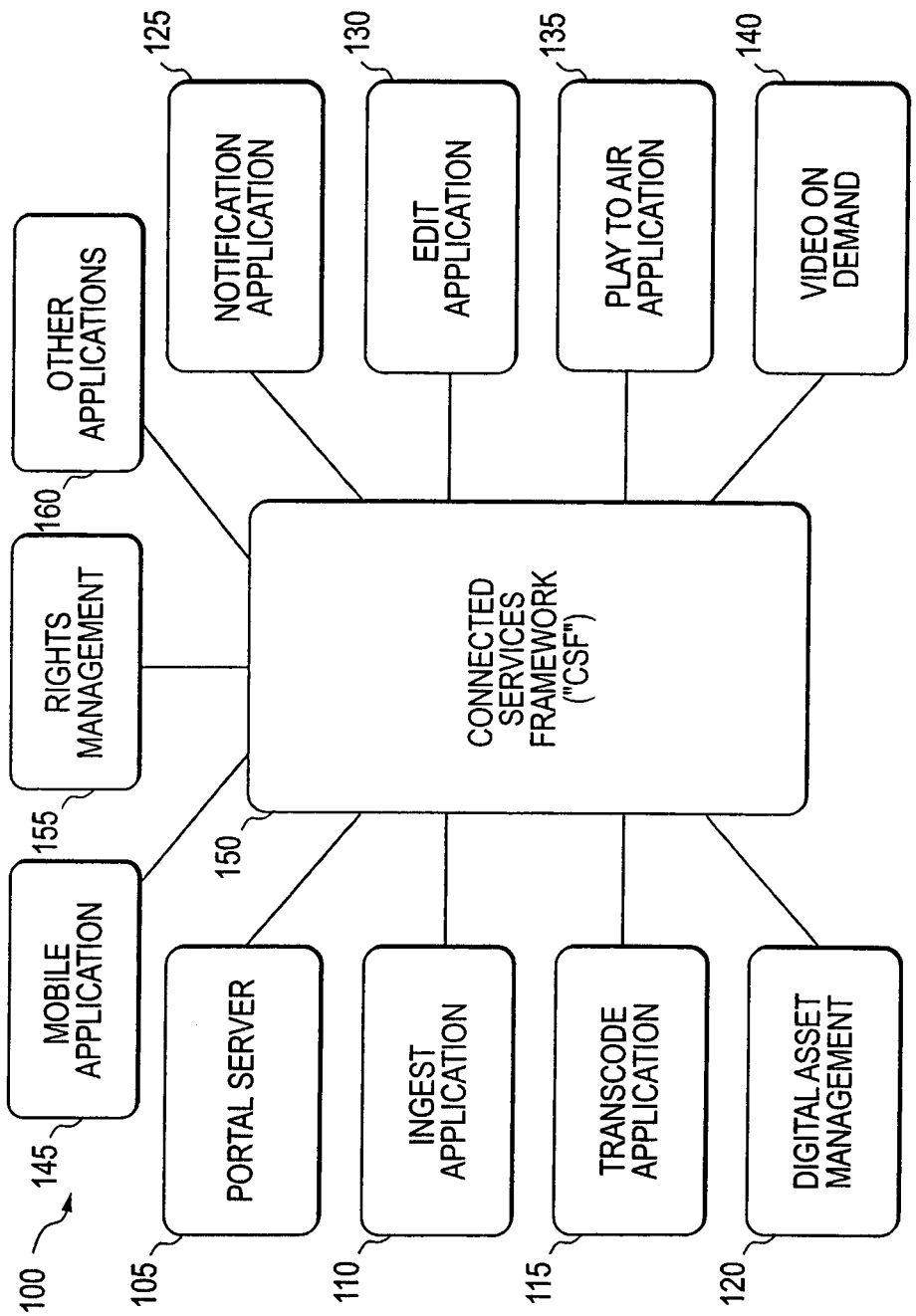
FIG. 1 is a block diagram showing an integrated content production environment in which a connected services framework interconnects various applications.

FIG. 1 is a block diagram showing an integrated content production environment 100 in which a connected services framework 150 is an enterprise service bus that interconnects various applications that assist in performing content production activities. These applications may include, among others, a portal server 105, an ingest application 110, a transcode application 115, a digital asset management system 120, a notification application 125, an edit application 130, a play to air application 135, a video on demand system 140, a mobile application 145, a rights management application 155 and other applications 160. The applications may be vendor applications or custom built applications.

The portal server 105 may be the SHAREPOINT PORTAL SERVER sold by Microsoft Corporation. The ingest application 110 may include a PANASONIC P2 ("Professional Plug-in") camera, which has a solid state P2 memory card. The transcode application 115 may be a TELESTREAM FLIP-FACTORY and TELESTREAM MEDIA APPLICATION PLATFORM ("MAP") system. The digital asset management ("DAM") application 120 may be the NORTH PLAINS TELESCOPE system. The notification application 125 may be enabled using the MICROSOFT LIVE COMMUNICATION server. The edit application 130 may be AVID UNITY MEDIANETWORK and AVID NEWSCUTTER XP editing software or Final Cut Pro HD editing software. The play to air application 135 may be a OMNIBUS VIDEO NETWORKS media system controlling OMNEON play-to-air servers. The video on demand application 140 may be MICROSOFT TV INTERNET PROTOCOL TELEVISION software platform. The mobile application 145 may be the MICROSOFT PORTABLE MEDIA CENTER system.

Figure 2:
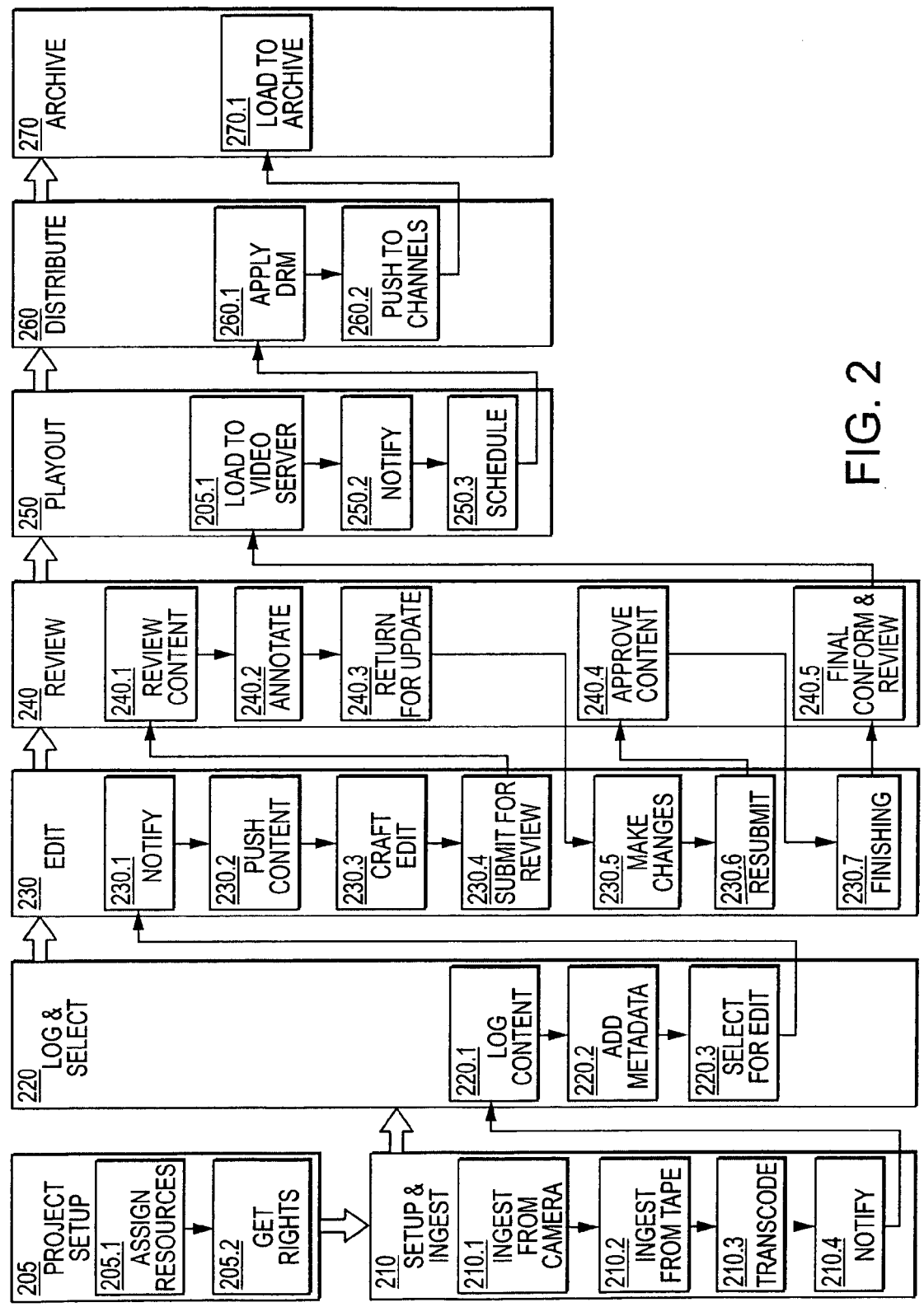
FIG. 2 is a flowchart that illustrates the procedures followed when using one embodiment of the invention.

FIG. 2 illustrates one of several possible embodiments of the invention. The embodiment shown in FIG. 2 uses the technology from FIG. 1 to provide a seamless, end-to-end digital production workflow, which can be conceptualized as eight stages, starting with setting up the project 205, then setting and ingesting the content 210 and proceeding through distributing 260 and finally archiving 270 the finished broadcast. The Connected Services Framework of the present invention provides flexibility to adapt the workflow and the applications used to suit the needs and changing circumstances of a production organization.

Figure 3:
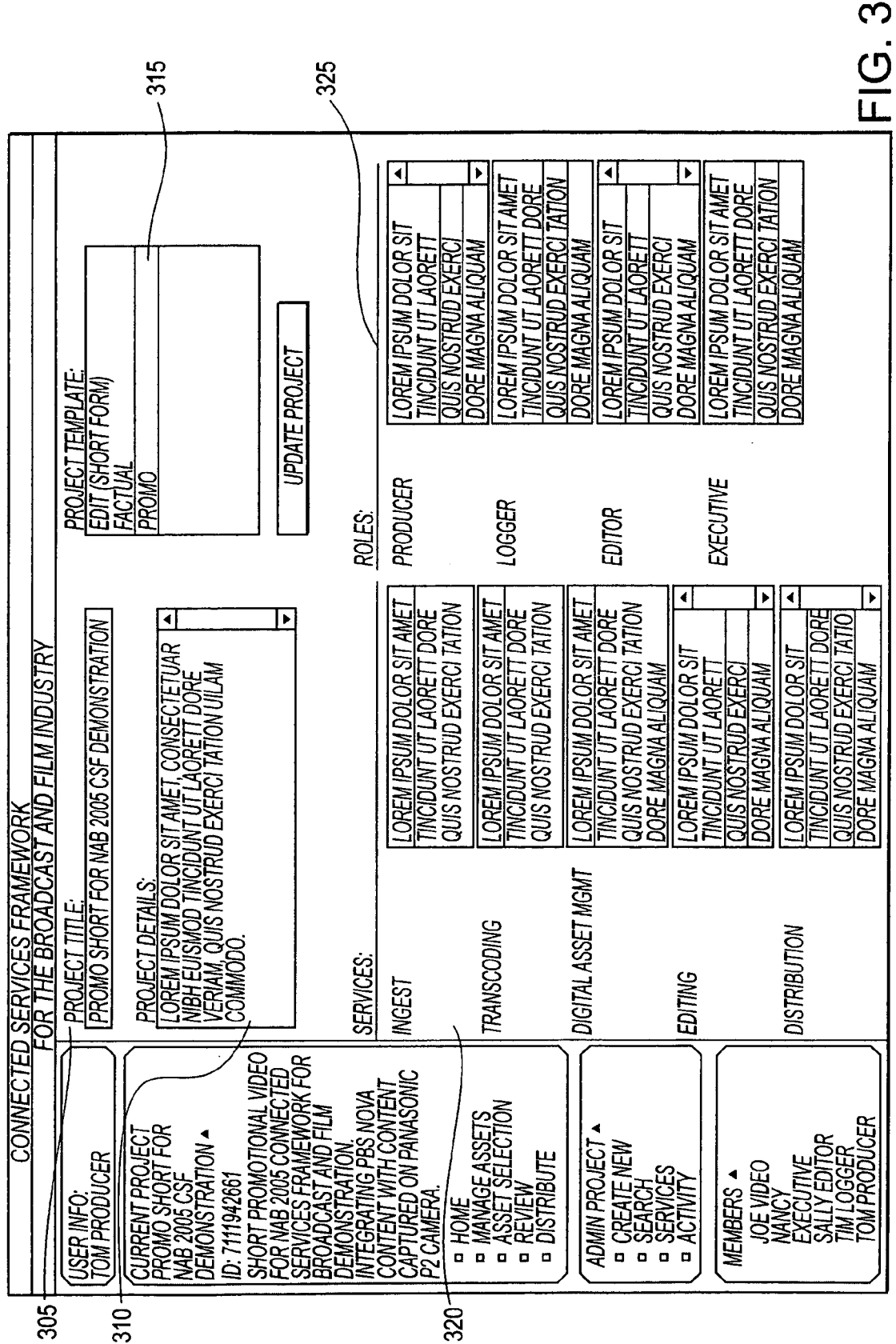
FIG. 3 is a screen shot of a new project being set up in the system.
Figure 4:
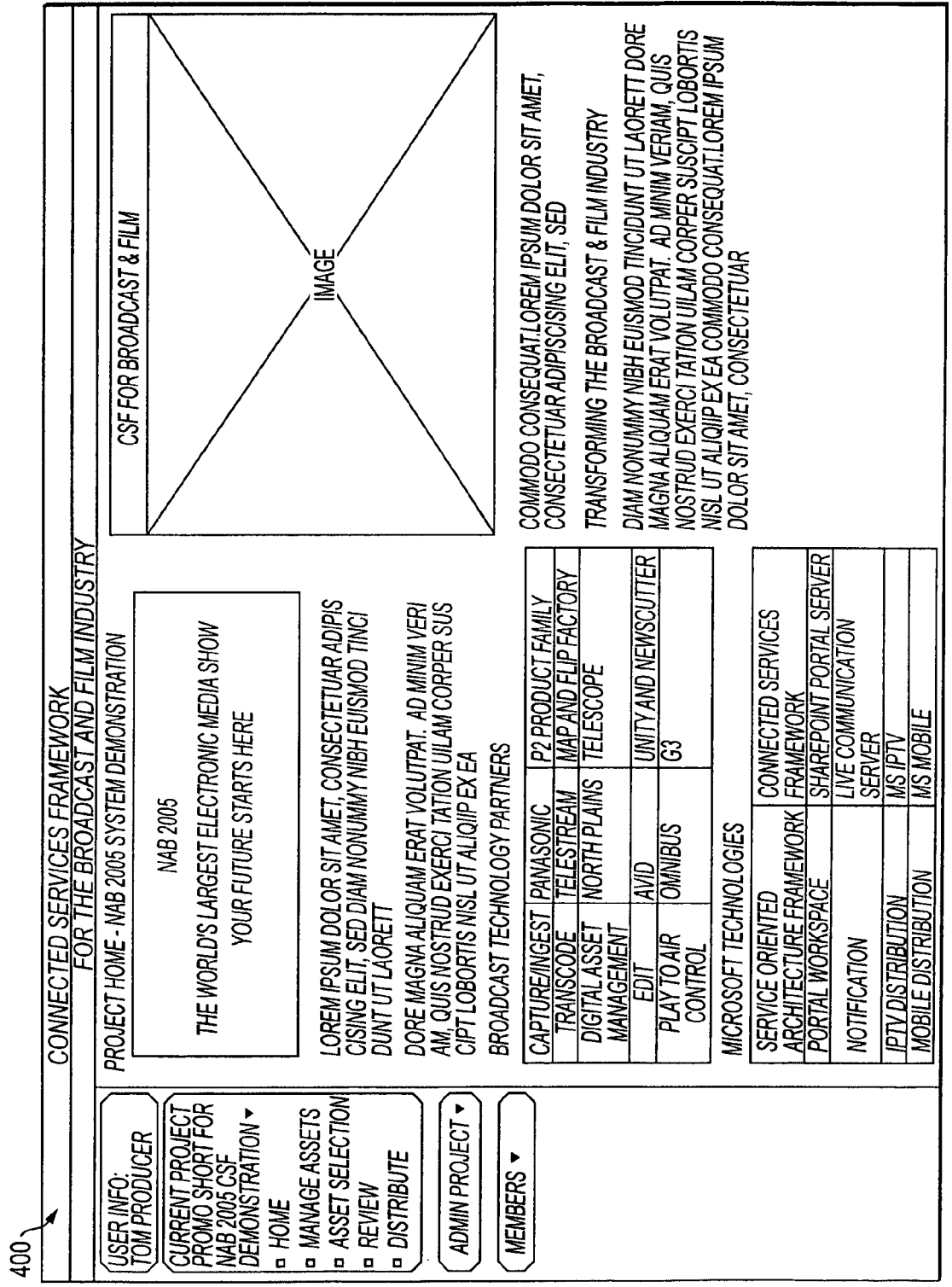
FIG. 4 is a screen shot of a project home page generated when a new project is created.

The project may first be setup by creating a template in the system. During this setup stage, plans and comments from the producers and executives can be centrally stored in the system and approval for the work may be obtained. FIG. 3 is a screen shot of a new project being set up in the system. The project is assigned a title 305. Details are captured for the project 310 and a template is chosen 315. At this point, the location for the various services to be performed are chosen 320 and the key players are assigned, such as the producer, logger, editor and executive 325. FIG. 4 is a screen shot showing that a project home page 405 is generated for the portal server 105 when a new project is created. This home page 405 allows team members to share information and to collaborate on the project. Through use of the screens in FIGS. 3 and 4, the invention enables users to set up multiple projects that can run in parallel.

At the start of a new project, it must first be setup 205. This includes assigning resources to the project 205.1 and negotiating/acquiring rights for the content 205.2. Once a new project is set up, content for it can be ingested from a camera 210.1 or a storage device, such as a tape deck 210.2 or P2 ingest deck, all of which can be controlled remotely. The control allows the operator to choose the desired in- and out-points from the footage. Once the shots are selected, the camera or storage device are cued as necessary and the content is ingested into the CSF system 200. During the ingestion, the content may be transcoded in a number of formats 210.3. For example, a broadcast-quality format may be a first format and a second format may be for later streaming over the internet for display by a computer's Windows media player or similar software.

Once the content has been ingested and transcoded, the invention may generate an automatic notification 210.4 to the logger to inform the logger that the content is ready. This notification can be through an instant message, an e-mail message, a voice mail message, a task item, a calendar item or other type of message. The notification can include a reference to the content or to the content production activity that the person being notified needs to perform. The reference may be instructions about the next content production activity. Or, the reference may be a link to an entry point of the application to be used by the recipient. This link enables the person responsible for logging to quickly and easily jump to the content or to the application that person will use to modify the content.

Figure 5:
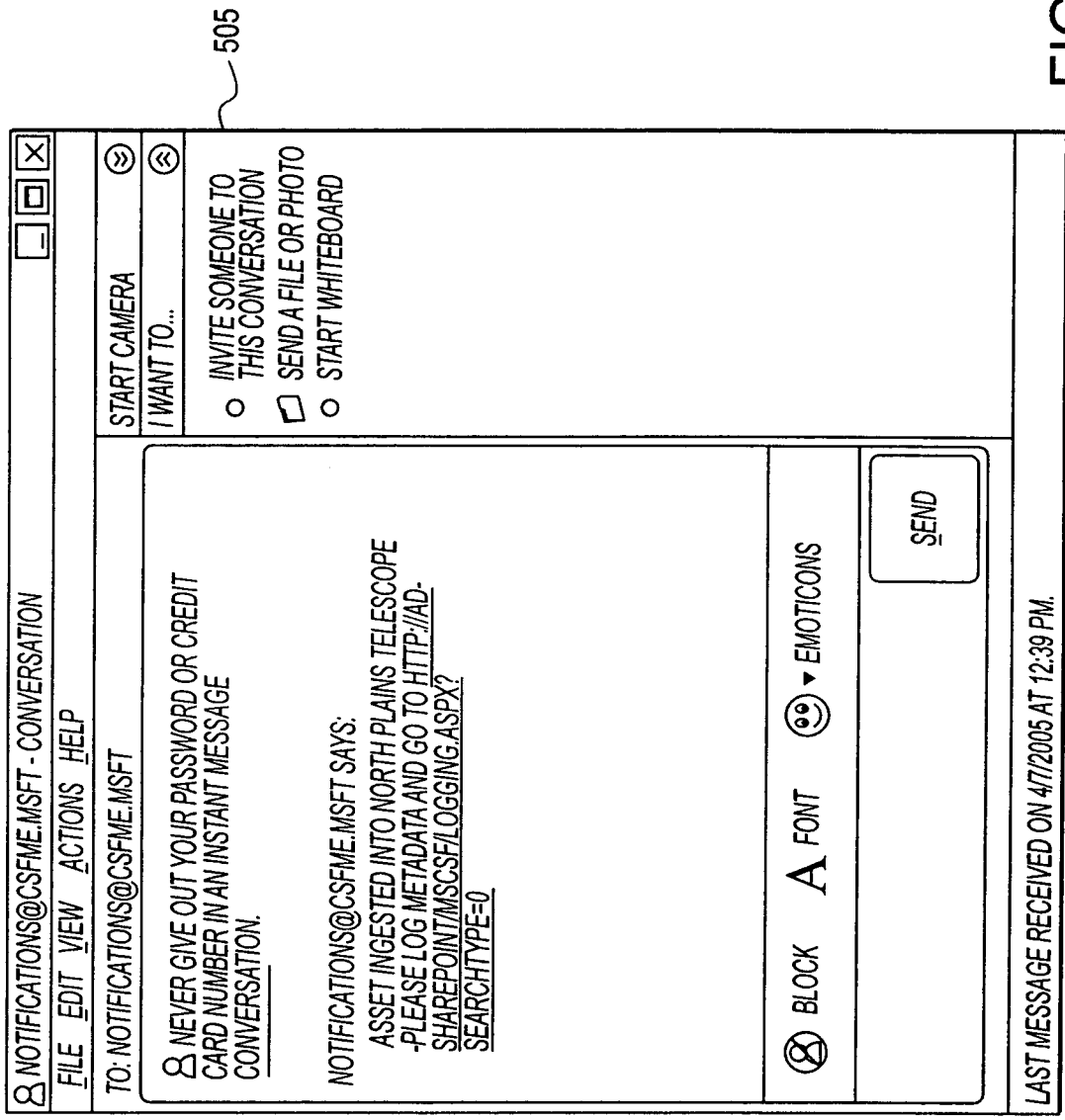
FIG. 5 is a screen shot showing an automated instant message.

In some embodiments, multiple notifications are sent. For example, the producer may be notified in addition to the logger to enable the producer to stay up-to-date on the progress of the project. In another embodiment, the same person may be informed two different ways. For example, both a voice mail and an e-mail message may be sent to the logger. FIG. 5 is a screen shot showing an automated instant message 505 indicating that the content asset has been ingested and is ready for metadata to be logged. This instant message includes a link 510 to the logging process.

The system may allow users to set up the preferred means for notification. For example, the logger may choose ahead of time that she wishes to be notified via an instant message while a producer may choose ahead of time that he wishes to be notified both via instant message as well as voice mail. The system may also leverage a set of notification rules to determine how to notify the one or more recipients. For example, work, vacation, or responsibility schedules may be used with rules to determine who the system notifies and by which medium.

Figure 6:
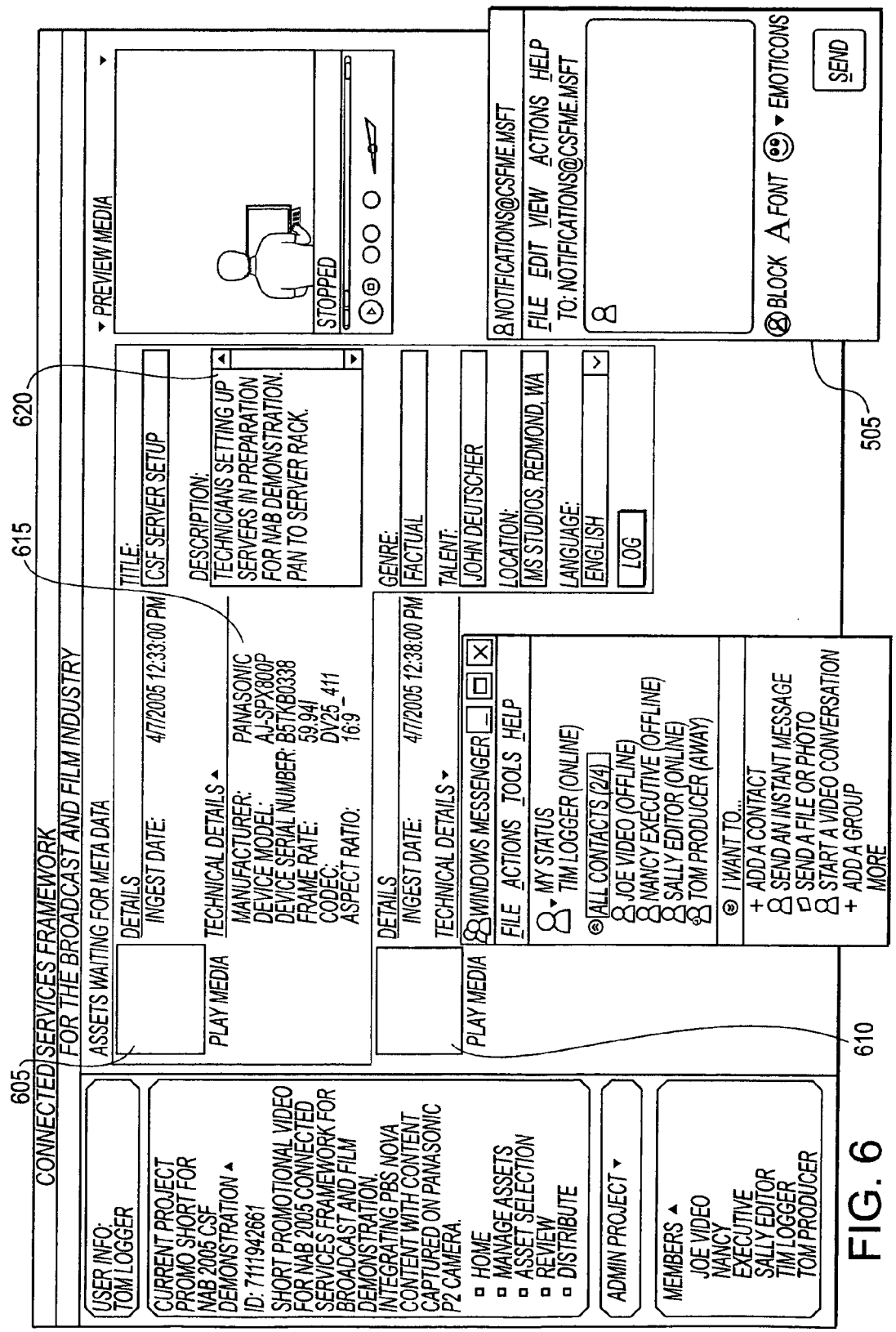
FIG. 6 is a screen shot showing that there are content assets waiting to be logged.

The next stage of content production (i.e, the logging stage 220), includes the logging of content 220.1, the addition of metadata to the content 220.2, and selecting the content for editing 220.3. After a user is notified (210.4) that there is new content footage, when she is available she can log information about the content, such as the subject, the location, and the shooting date. The content can be organized into its appropriate project. FIG. 6 is a screen shot showing that there are content assets 605 and 610 for the project that are waiting to be logged with metadata. The logger may select either asset to be played. The logger can also review any associated technical meta data 615 (from the MXF file, for example) for the asset Having reviewed the clip, the logger can assign descriptive metadata to the asset 620. If desired, the logger can mark up the "circle takes". Circle takes indicate the best or most appropriate takes in the content from a number of shots.

Figure 7:
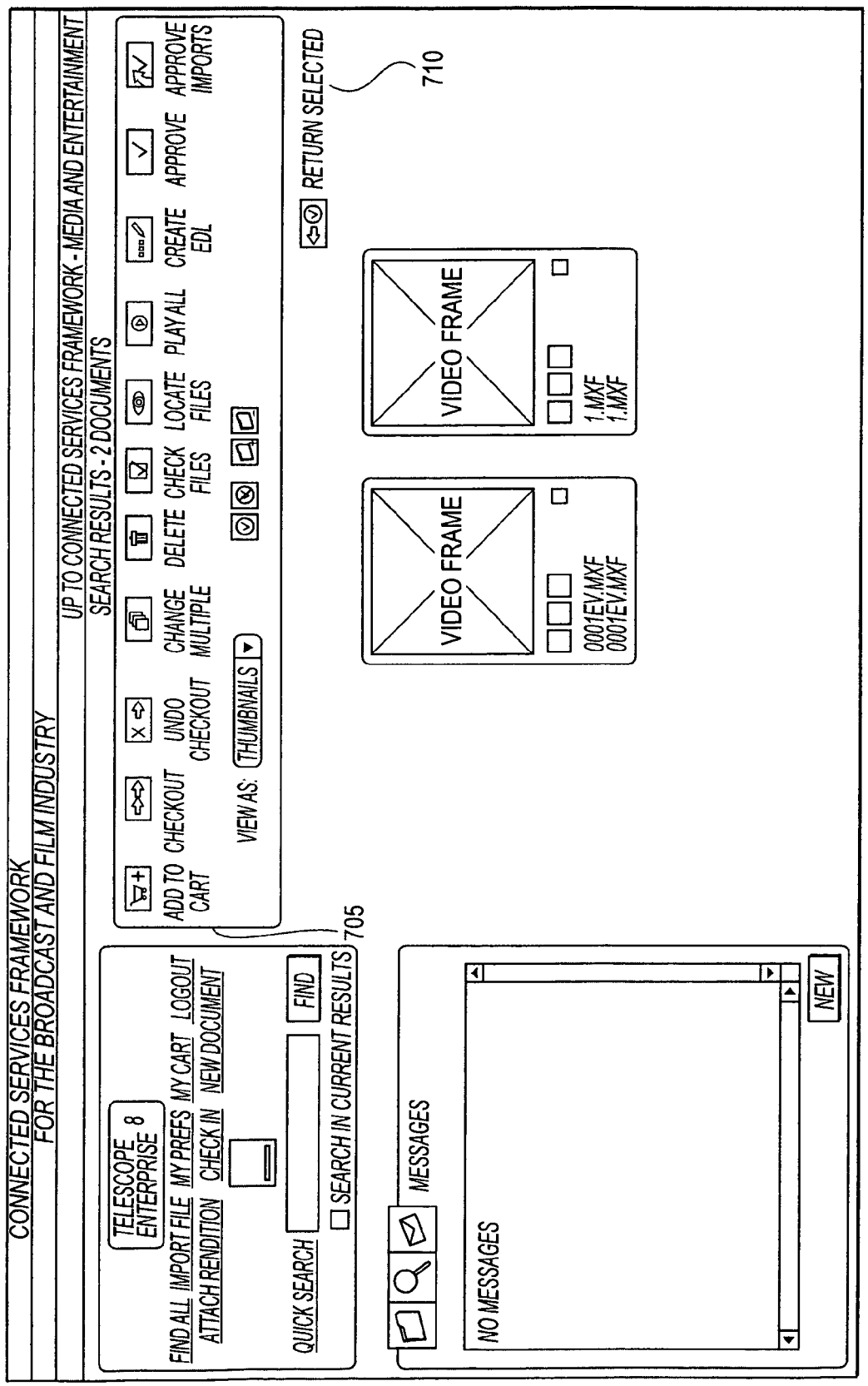
FIG. 7 is a screen shot showing a search interface for the DAM.
Figure 8:
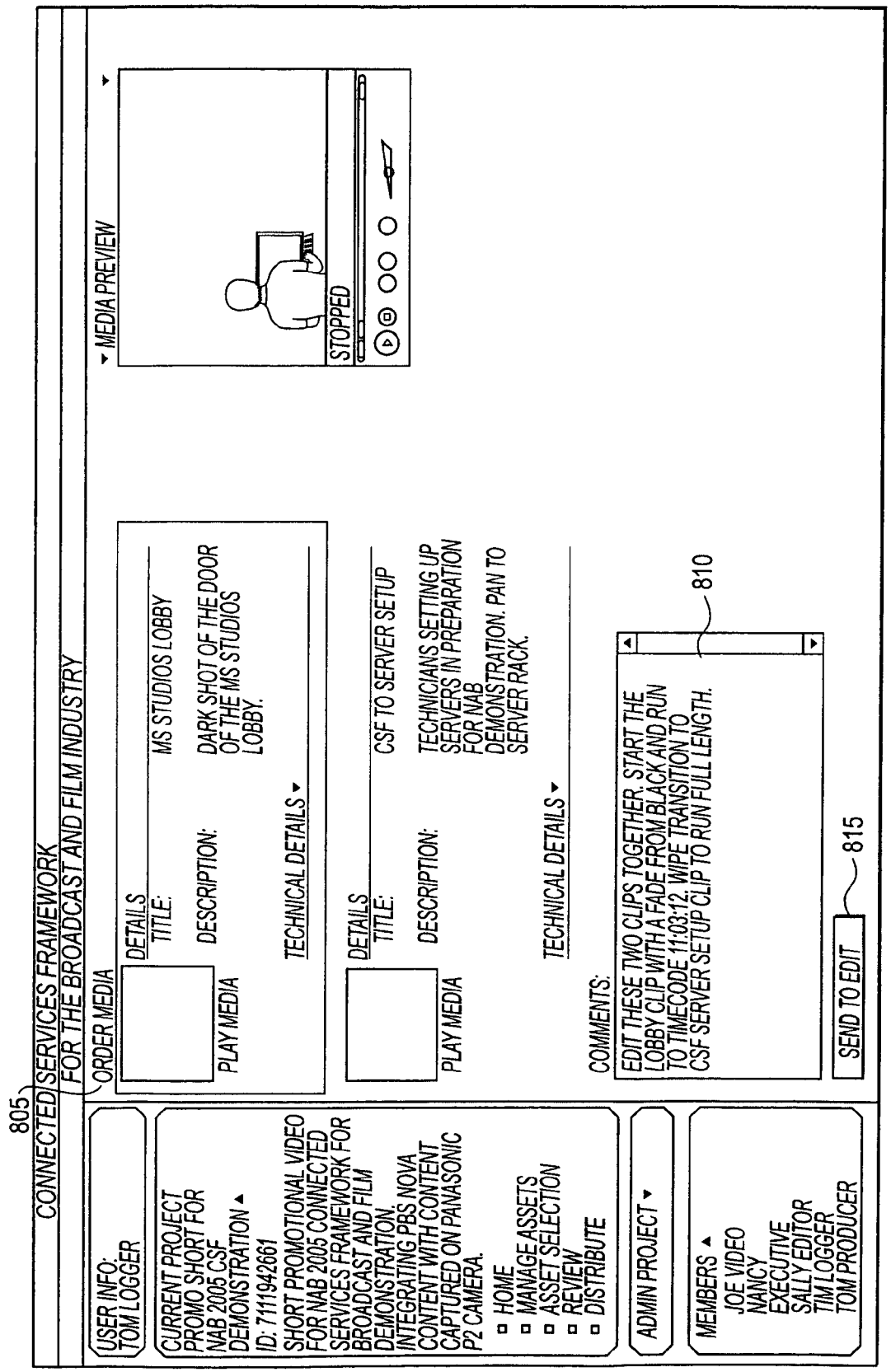
FIG. 8 is a screen shot of the "order media" feature.
Figure 9:
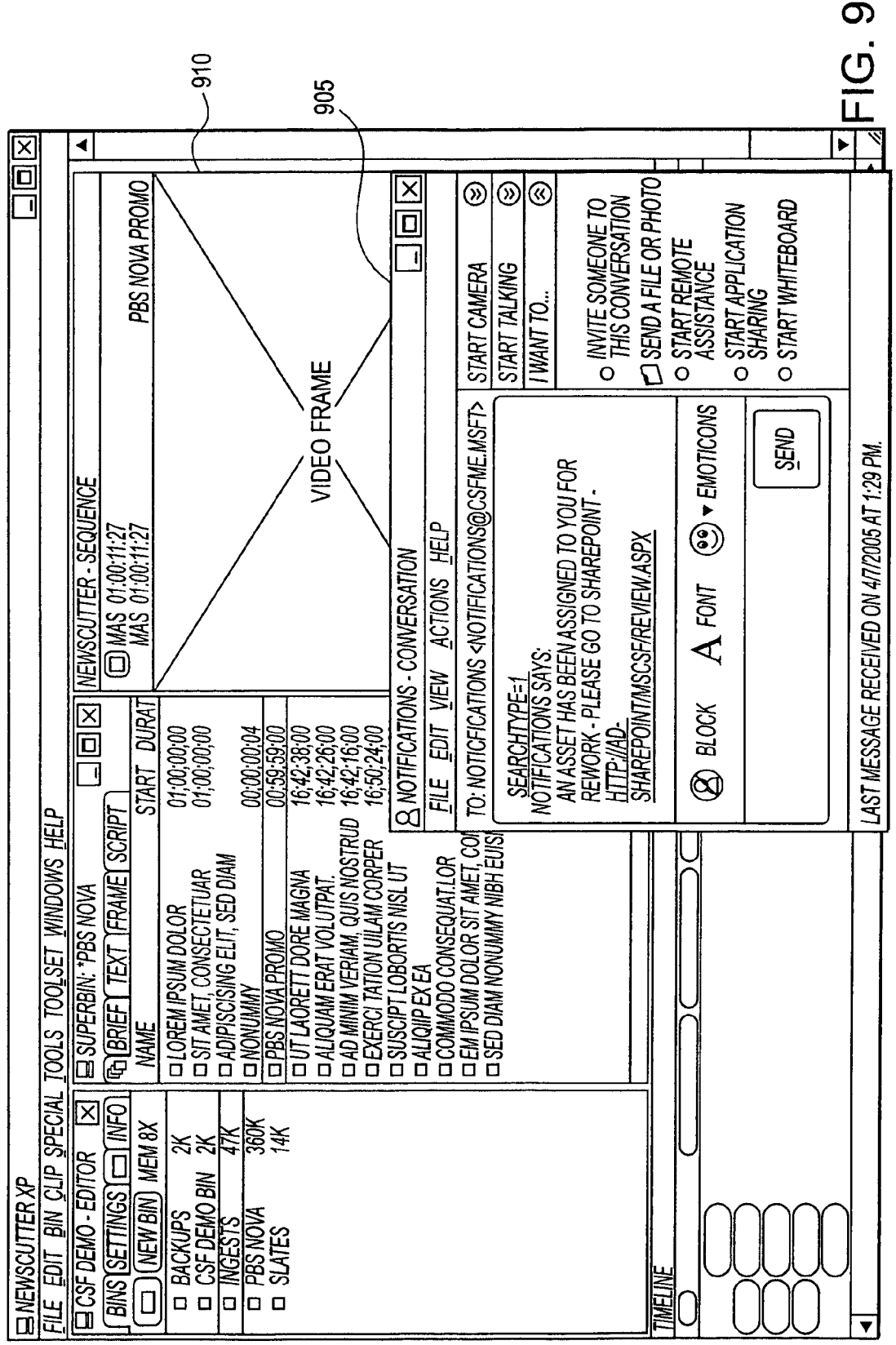
FIG. 9 is a screen shot showing the edit application.

In one embodiment, a producer is notified of new assets and she uses the digital asset management ("DAM") 120 system to select assets for editing. FIG. 7 shows that a search interface 705 for the DAM is embedded within the invention to enable the selection of assets. When the producer is finished selecting assets for editing, the producer can click on the appropriate button 710 to be re-directed to an "order media" area of the invention 805, as shown in FIG. 8. From here, the producer can order (i.e., arrange) the clips into a sequence, add detailed instructions 810 to the edit package, and send the request to the Editor 815.

At this point, a notification is sent to the editor 230.1 and 905 notifying the editor of the new edit work package. As in step 210.4, the notification can be an automated instant message, voice mail message, e-mail message, or other type of notification that is sent to one or more people. The notification can also be a combination of these. The invention transfers the assets from the DAM 120 to the edit application 130 and 910 via the CSF 150. In the editing stage 230, what is known in the industry as 'dailies' are pushed to a craft edit station 230.2. A notification can be sent to the correct editor to let her know that new material is available for editing. The editor then works at the craft edit station 230.3 and edits the footage to create a rough edit according to instructions from the producer. When the edit is complete, the editor exports the newly edited media to a project export folder, which causes the CSF 150 to route the asset to the DAM 120.

Figure 10:
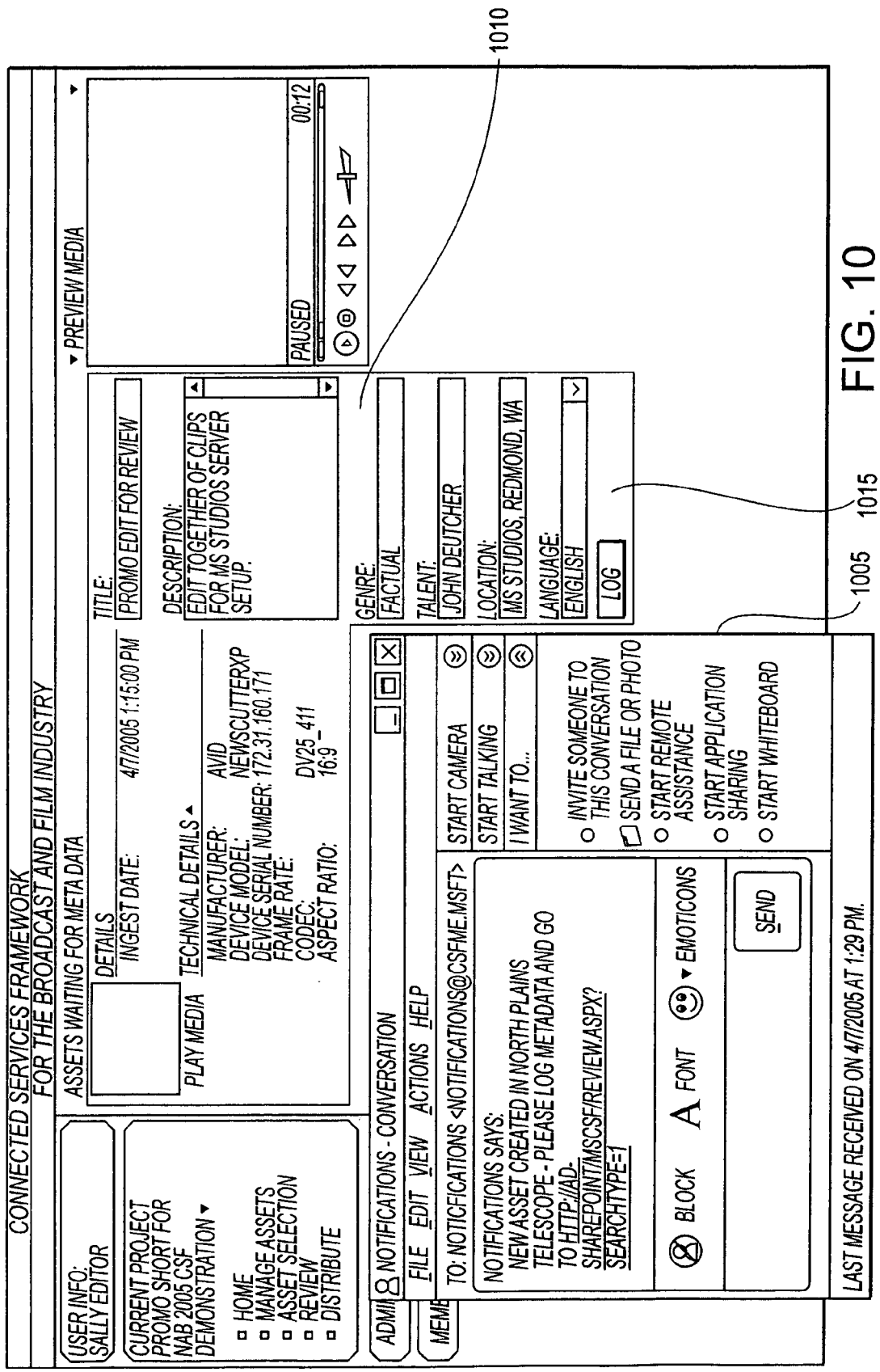
FIG. 10 is a screen shot showing meta data being logged.
Figure 12:
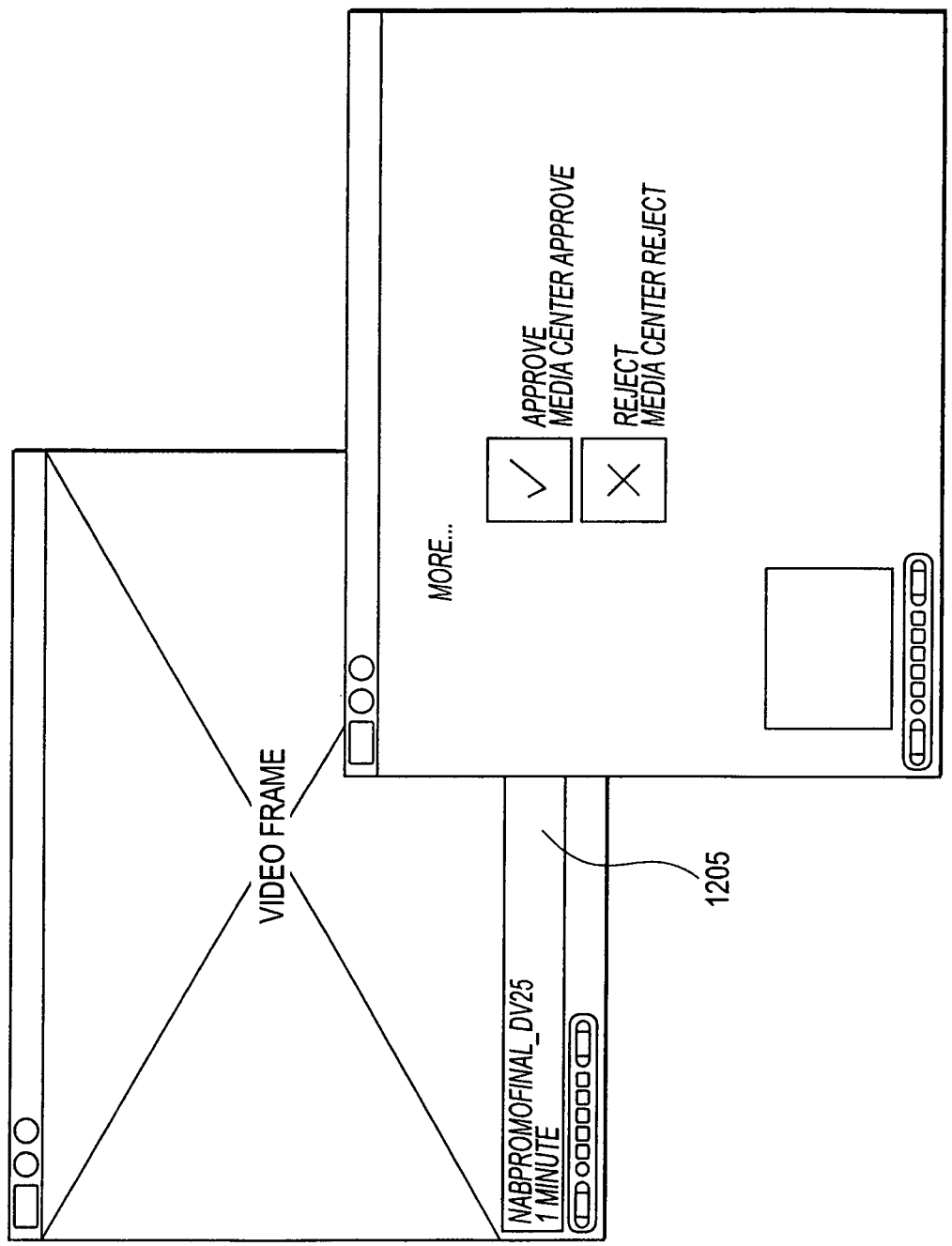
FIG. 12 is a screen shot of the executive review feature.

When the newly created asset has been uploaded into the DAM 120, an automated notification 1005 (from FIG. 10) is sent to the editor inviting the editor to log the asset. The notification may include a URL to the logging page. The editor enters the new metadata 1010 and clicks the "Log" button 1015. This causes a message to be sent via the CSF 150 to the DAM 120 to update the metadata for the new asset.

Figure 11:
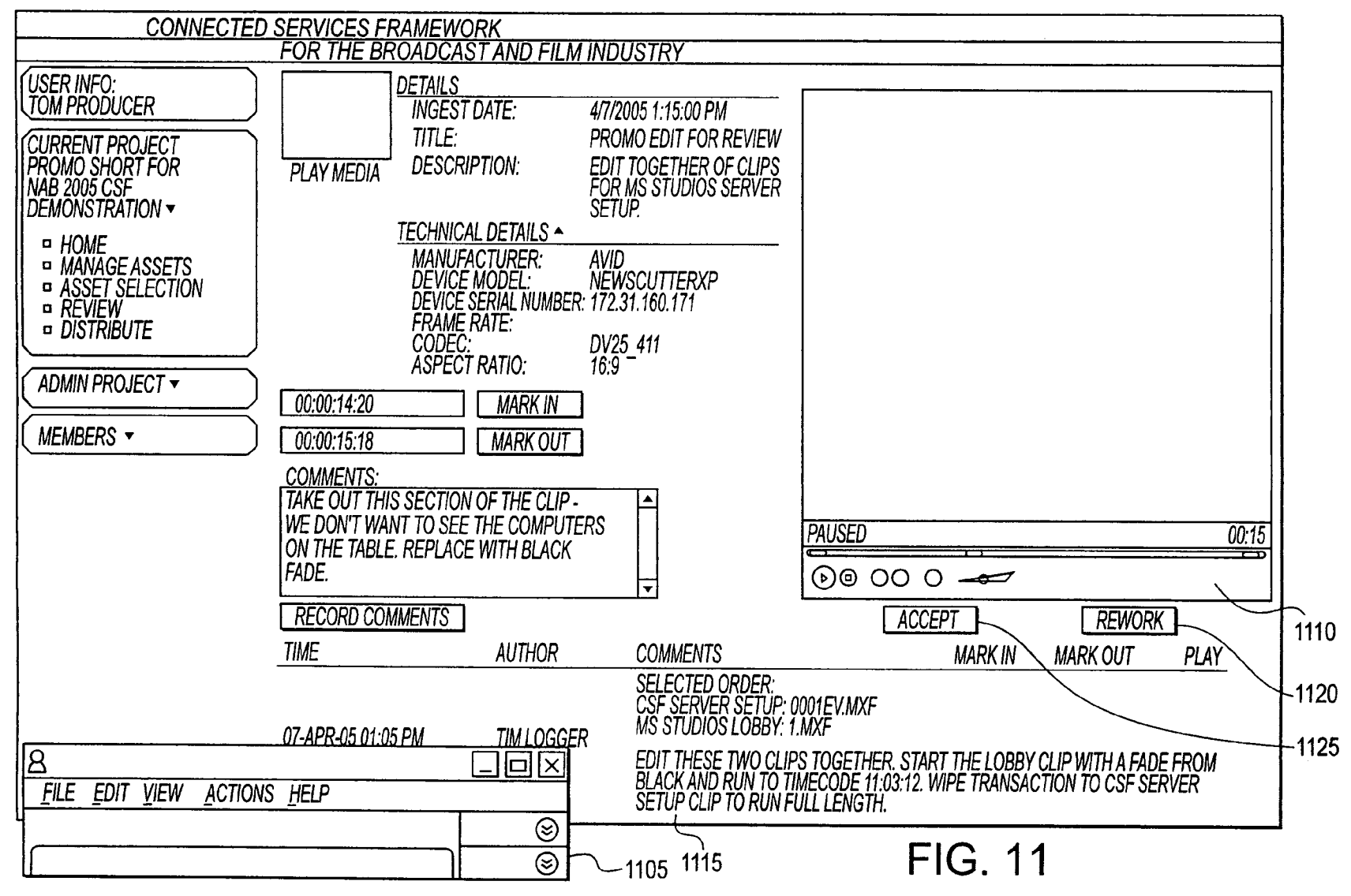

The reviewing stage 240 begins by the producer being notified by an automated notification message 1105 that an edit is available for review. This notification may include a link to the review screen (shown in FIG. 11). Here, the producer may review 240.1 the rough edit through a web front-end 1110 or a set top box. During his review, the producer annotates the rough edit by adding his notes 240.2 and 1115. In some embodiments, the notes are linked to a particular frame or timecode and allow for pen-based input. Such a feature allows a mark up on a particular show and accepts a sketch of what changes need to be made. Once the producer is finished making his comments, he may click the "rework" button 1120 to return the rough edit to the editor 240.3.

The editor is automatically notified that the comments from the producer have been delivered and further editing is requested. The editor then goes through the producer's comments and reviews the archive footage. He may import some of this archived footage into the rough edit. In some embodiments, rights management information is included with the archive footage. The information may be included alongside the footage in a textual format, or the information may be embedded digitally or graphically within the footage or the medium upon which the footage is stored. The producer and editor can communicate via VOIP or instant message as the editor makes the requested changes 230.5. The second version of the edit is then resubmitted 230.6 by the editor to the producer and the producer reviews all of the changes. If everything is in order, the producer clicks the "Accept" button 1125. An executive is then automatically notified that the program is ready for approval for distribution. For ease of review, the executive can review the program through a regular television via the video on demand application 140 and 1205. The executive can click the "approve" button 1210 to trigger an automated notification to the producer that the content is approved for distribution.

Once both the necessary people approve the program, the editor may receive an automated notification. He may then carry out the finishing process 230.7 which may include sweetening the audio and/or altering the coloration where required. Then the edit decision list ("EDL") is used to conform the broadcast quality media into the finished package 240.5. Previews of the finished program are made available to review by the executive and producer.

The playout stage 250 begins once the program has been conformed. The finished package is loaded to a playout video server 250.1. An automated notification informs the producer that the video has been loaded 250.2. Another notification can been sent to the scheduler/controller, to inform her that the new content is available. Through the notification message, the scheduler/controller can link to the video server to watch a preview of the content. Some final changes may be made to the content, such as adding breaks for commercials. Once this is done, the new program is scheduled for playout 250.3.

Figure 13:
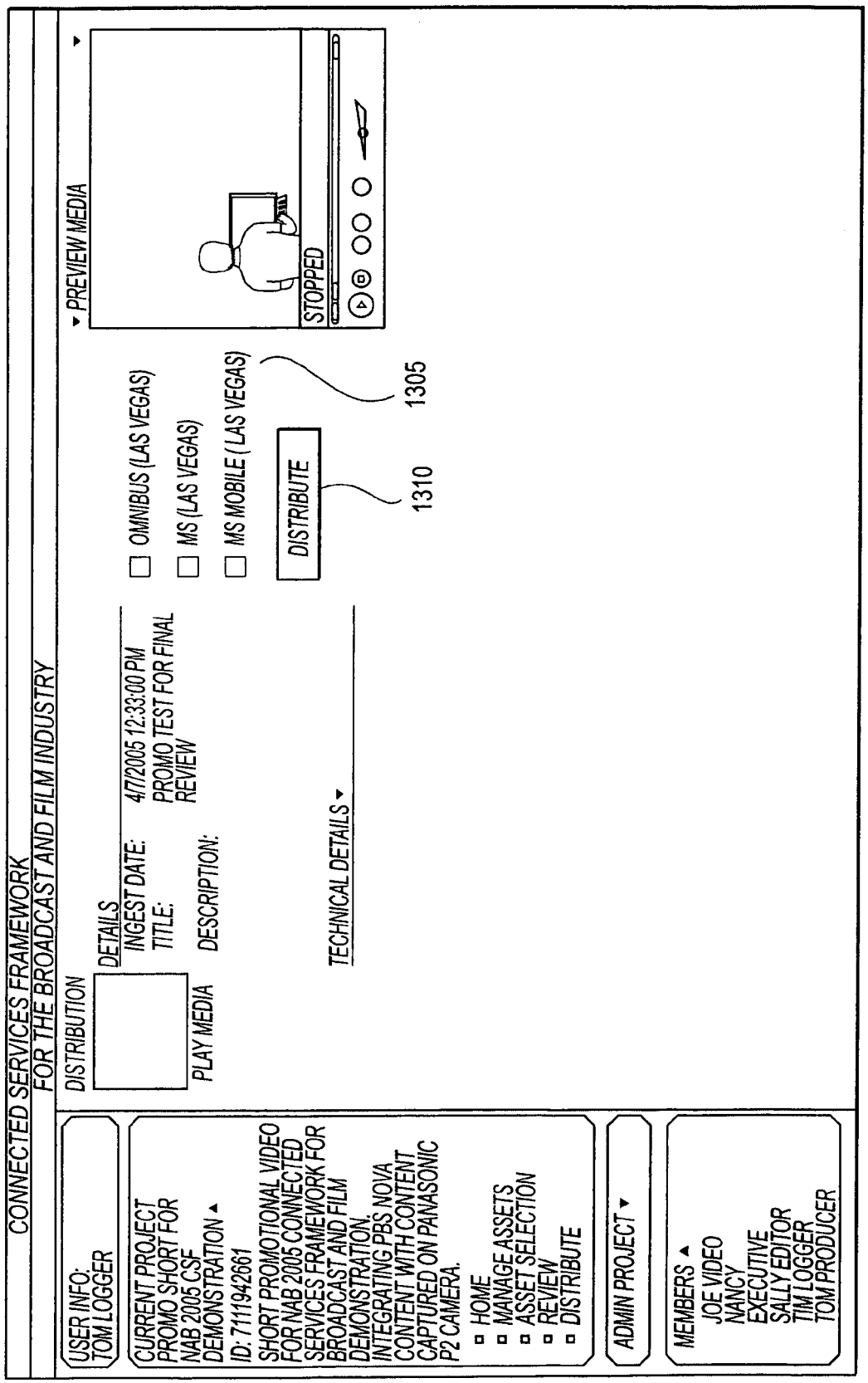
FIG. 13 is a screen shot of the distribution feature.

Digital rights management ("DRM") may be applied to the program to prevent unauthorized duplication 260.1. The schedule triggers a generation of content across the various media channels 260.2 based on a series of profiles which are driven off the metadata distribution options that are selected (1305 in FIG. 13). This allows the content for the Internet to be automatically delivered just after the show is televised, for example.

The finished program, along with the component footage, is then added to the archive 270.1 and is available for other commercial applications. For examples, the program may be sold in DVD format at a later point.

Having now explained the end-to-end steps involved in the integrated content production process, various aspects within that process will now be addressed. Providing a log file of human and non-human activity will first be discussed, followed by a discussion of dynamically triggering notifications. Thirdly, leveraging excess resources will be discussed.

Logging Tool

Figure 14:
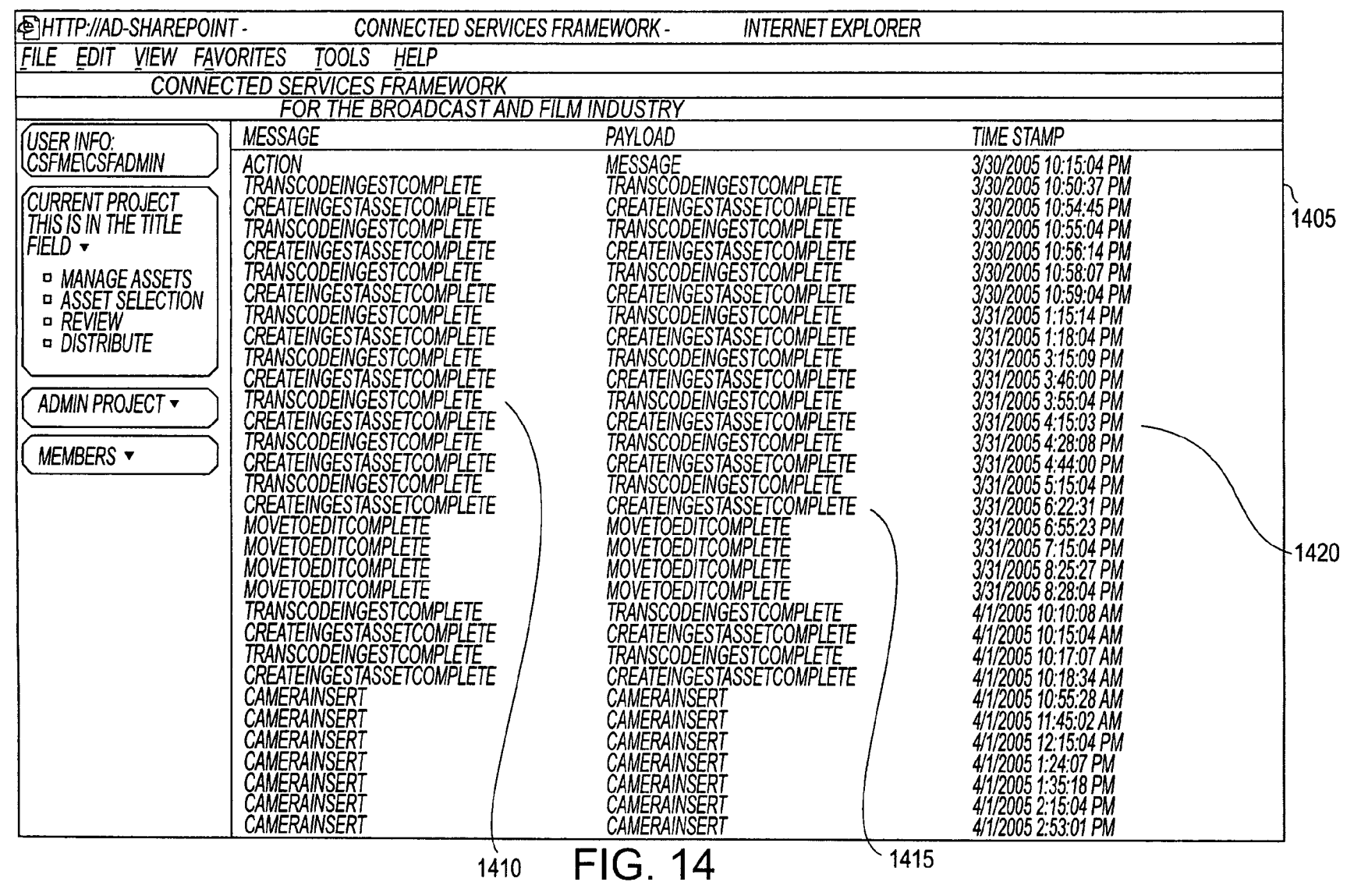

Throughout the end-to-end production process, the present invention tracks action data in a log file about the events, including the actions taken by the human users as well as the activities undertaken by and between the various applications of the system. Actions with external applications or users via web services may also be tracked in the log file. The log data enables an organization to simply and accurately capture operational data, including edit suit utilization, asset volumes, network performance, etc. This data enables an organization to plan and operate efficiently. FIG. 14 is a screen shot showing a data log file 1405 for one embodiment of the invention. For each event that occurs, the message 1410 and time stamp 1420 are stored in the log.

Action data may include messages that are exchanged between applications and/or human users. In certain embodiments, the invention stores the payload 1415 of the messages in the log file. The payload 1415 may be the contents of a SOAP message, encoded key frame image data, or other graphic file representative of the content asset. The payload information 1415 is useful for analyzing the work being undertaken. The payload information 1415 can be used by external applications for billing and other purposes.

Dynamically Triggered Notifications

Figure 15:
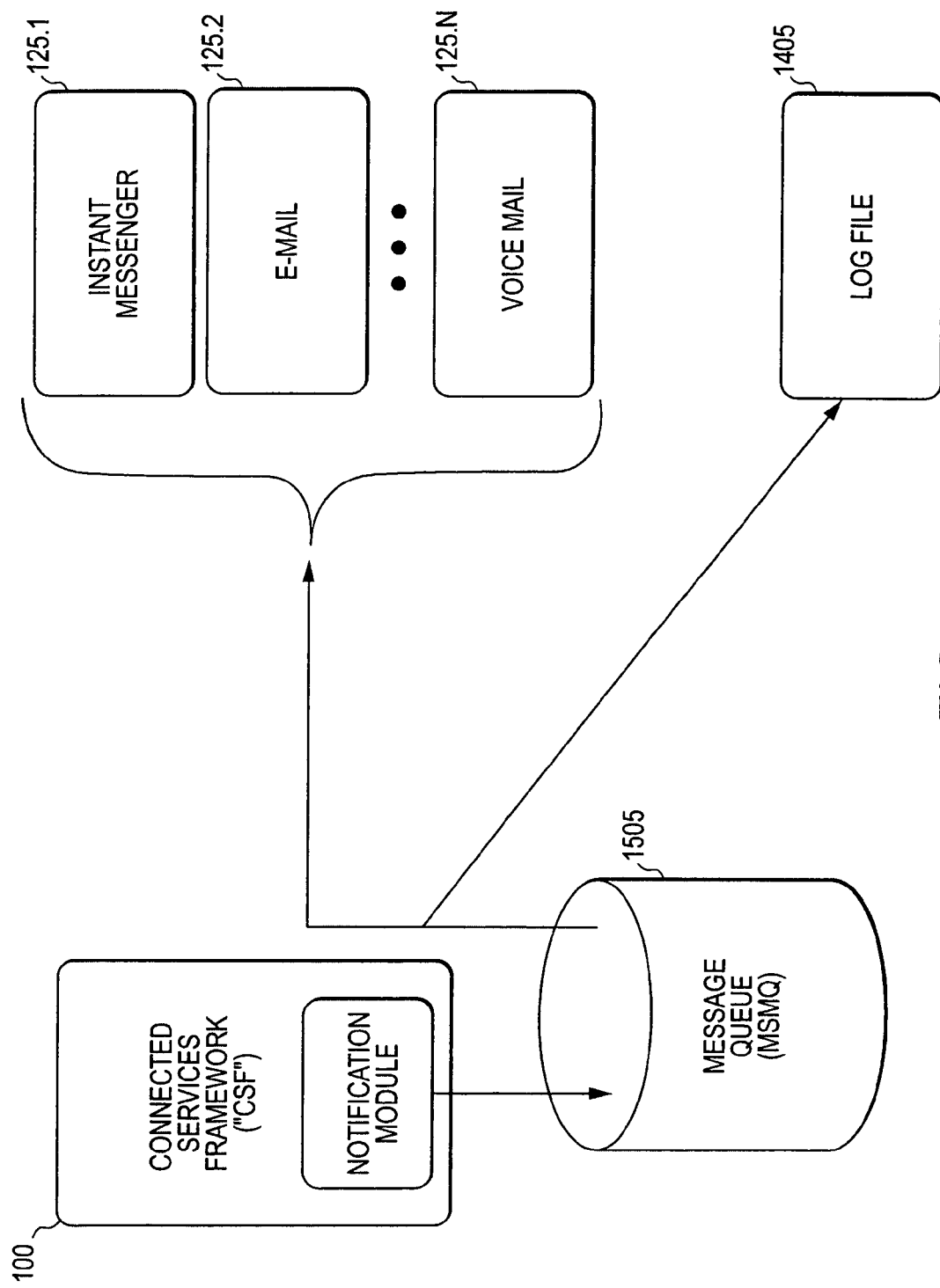
FIG. 15 is a block diagram illustrating dynamically triggered notifications.

FIG. 15 is a block diagram illustrating dynamically triggered notifications. In one embodiment, the CSF 150 sends out all of the notifications as messages to the message queue 1505. The message queue 1505 can be implemented using Microsoft Message Queuing ("MSMQ") technology. MSMQ enables applications to communicate (both synchronously and asynchronously) across networks and systems, even when those networks or systems are temporarily offline. The MSMQ dequeues messages and sends them to the one or more desired notification applications 125, such as an instant messenger application 125.1, an e-mail application 125.2, a voice mail application 125.N, etc. In some embodiments, the notification is sent to a user's calendar or task-list. A copy of the message is also logged 1405.

Leveraging Excess Resources

Figure 16:
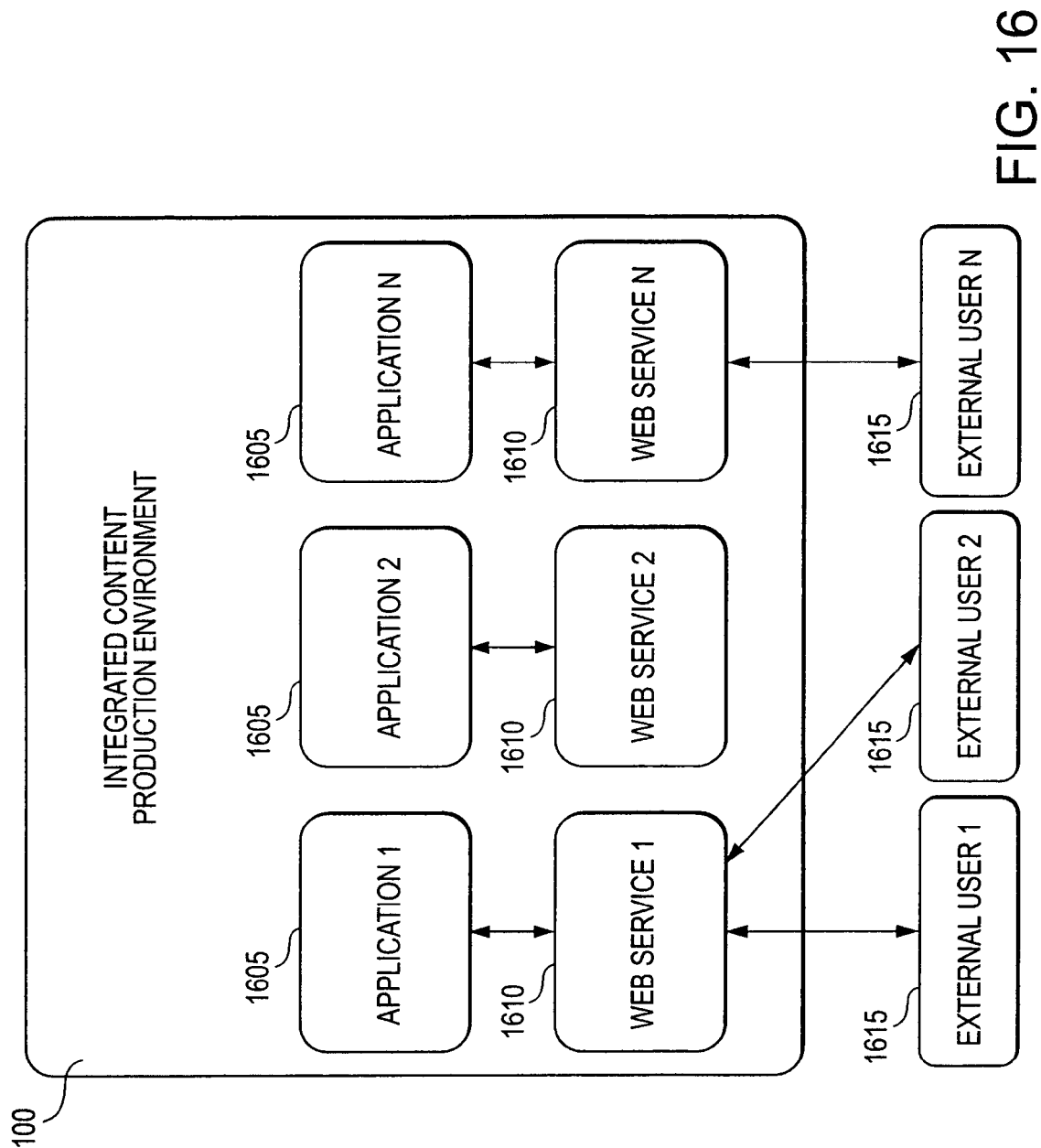
FIG. 16 illustrates one embodiment of leveraging excess resources.

Normally, as shown in FIG. 16, the applications 1605 within the integrated content production environment 100 are for use internally within an organization as part of the content production environment. However, from time to time there may be excess capacity or resources by one or more of the applications. Or, from time to time there may be excess capacity from one or more of the personnel working in the content production environment 100. The present invention enables this excess in computing power or people power to be an additional revenue generator.

FIG. 16 illustrates one embodiment of leveraging excess resources. This excess is leveraged by allowing outside users 1615 access to one or more of the applications 1605 via one or more web services 1610. In some embodiments, excess capacity for a set of applications is made available to external parties. In yet other embodiments, content assets are received in the content production environment 100 from an external user 1615. One or more production personnel act upon the content asset by executing one or an aggregated series of content production activities to generate a deliverable asset from those actions. This deliverable asset is then sent to the external user 1615. In this way, the external user 1615 is able to accomplish the one or the aggregated series of content production activities by calling the web service.

Access to the applications 1605 may be offered for payment by the external user 1615. In another embodiment, access to the resources may be auctioned off, such as on eBay. Other payment methods may also be applied to this process.

The foregoing description addresses embodiments encompassing the principles of the present invention. The embodiments may be changed, modified and/or implemented using various types of arrangements. Those skilled in the art will readily recognize various modifications and changes that may be made to the invention without strictly following the exemplary embodiments and applications illustrated and described herein, and without departing from the scope of the invention, which is set forth in the following claims.

What is claimed is:

1. A computer-implemented method for making a content production environment accessible, comprising:
   interconnecting a plurality of applications of the content production environment using an enterprise service bus;
   identifying, by at least one processor, excess capacity associated with one application from the plurality of applications, wherein functionality of the one application is accessible via a web service;
   automatically providing, by the at least one processor, a notification to a first recipient when the first recipient is needed to perform a content production activity, the notification providing a reference to the content production activity;
   providing, by the at least one processor, the functionality of the one application to a system external to the content production environment through the web service;
   tracking, by the at least one processor, action data associated with the one application provided through the web service; and
   storing, in a log file, the tracked action data.

2. The method of claim 1, further comprising:
   tracking action data associated with the use of the web service.

3. The method of claim 2, further comprising:
   accepting payment according to the tracked action data associated with the use of the web service.

4. The method of claim 1, wherein identifying excess capacity comprises:
   identifying excess capacity for a set of applications from the plurality of applications, wherein functionality of the set of applications is accessible via a web service.

5. The method of claim 1, wherein identifying excess capacity comprises:
   identifying excess capacity for a series of activities in the content production environment, wherein functionality of the series of activities is accessible via a web service.

6. The method of claim 1, further comprising:
   receiving payment for use of the web service.

7. The method of claim 1, further comprising:
   auctioning off the excess capacity associated with the one application from the plurality of applications.

8. A content production computer system for supplying functionality from a content production environment, comprising:
   a processor; and
   memory containing instructions which, when executed by the processor, perform a method comprising:
      interconnecting a plurality of applications of the content production environment;
      executing the plurality of applications;
      identifying excess capacity associated with one application from the plurality of applications, wherein functionality of the one application is accessible via a web service;
      automatically providing a notification to a first recipient when the first recipient is needed to perform a content production activity, the notification providing a reference to the content production activity;
      providing the functionality of the one application to a system external to the content production computer system through the web service;
      tracking action data associated with the one application provided through the web service; and
      storing the tracked action data in a log file.

9. The system of claim 8, the method further comprising:
tracking action data associated with the use of the web service.

10. The system of claim 9, the method further comprising:
accepting payment according to the tracked action data associated with the use of the web service.

11. The system of claim 8, wherein identifying excess capacity comprises:
identifying excess capacity for a set of applications from the plurality of applications, wherein functionality for the set of applications is accessible via the web service.

12. The system of claim 8, wherein identifying excess capacity comprises:
identifying excess capacity for a series of activities in the content production environment, wherein functionality for the series of activities is accessible via the web service.

13. The system of claim 8, wherein the memory contains instructions which, when executed by the processor, perform the method further comprising:
accepting payment for use of the web service.

14. The system of claim 8, wherein the memory contains instructions which, when executed by the processor, perform the method further comprising:
auctioning off the excess capacity associated with the one application from the plurality of applications.

15. The system of claim 8, wherein tracking action data comprises tracking actions between (1) the user and the plurality of applications, (2) the one application and a second application of the plurality of applications, (3) between the one application and content data, and (4) between the system external to the content production computer and the web service.

16. The system of claim 8, the method further comprising:
automatically providing a monitoring notification to a second recipient when the first recipient is needed to perform a content production activity,
wherein the monitoring notification is at least one of an instant message, an e-mail message, a voicemail message, a task item, a calendar item, or other type of message, and
wherein the second recipient can select the method of providing the monitoring notification.

17. The system of claim 8, wherein the notification is automatically provided when the excess capacity associated with the one application is identified.

18. The system of claim 8, wherein the notification is automatically provided when a second content production activity is completed.

19. The system of claim 8, wherein the action data includes messages exchanged between one or more of the plurality of applications and the user.

* * * * *

UNITED STATES PATENT AND TRADEMARK OFFICE
CERTIFICATE OF CORRECTION

PATENT NO. : 8,595,323 B2  
APPLICATION NO. : 11/401985  
DATED : November 26, 2013  
INVENTOR(S) : Stephen Deane et al.

Page 1 of 1

It is certified that error appears in the above-identified patent and that said Letters Patent is hereby corrected as shown below:

Title Page: Item 57

Abstract, Line 10, "both users the applications" should read as --both users and the applications--.

Signed and Sealed this
Twenty-fifth Day of March, 2014

Michelle K. Lee
*Deputy Director of the United States Patent and Trademark Office*